United States Patent
Ryu

(10) Patent No.: US 7,525,899 B2
(45) Date of Patent: Apr. 28, 2009

(54) DEVICE FOR TRAVERSING OPTICAL PICKUP OF A DISC DRIVE

(75) Inventor: Kye-Yeon Ryu, Gyeonggi-Do (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 510 days.

(21) Appl. No.: 10/864,581

(22) Filed: Jun. 10, 2004

(65) Prior Publication Data

US 2004/0255316 A1    Dec. 16, 2004

(30) Foreign Application Priority Data

Jun. 13, 2003    (KR) ...................... 10-2003-0038426

(51) Int. Cl.
G11B 7/08    (2006.01)

(52) U.S. Cl. ....................... 369/223; 369/218; 720/675; 720/663

(58) Field of Classification Search ................. 720/676, 720/674, 675, 663, 664, 665; 369/219.1, 369/223, 218
See application file for complete search history.

(56) References Cited

U.S. PATENT DOCUMENTS

| 5,191,575 | A | * | 3/1993 | Kido | 369/223 |
| 5,535,076 | A | * | 7/1996 | Kamioka et al. | 360/267.4 |
| 5,889,638 | A | * | 3/1999 | Kabasawa et al. | 360/261.3 |
| 6,058,098 | A | * | 5/2000 | Kato | 720/663 |
| 6,335,915 | B1 | * | 1/2002 | Uchiyama et al. | 369/223 |
| 6,683,841 | B2 | * | 1/2004 | Lin | 720/665 |
| 6,700,859 | B2 | * | 3/2004 | Oono et al. | 369/223 |
| 6,724,714 | B1 | * | 4/2004 | Kato et al. | 720/672 |
| 6,880,164 | B2 | * | 4/2005 | Kato et al. | 720/676 |
| 6,947,369 | B2 | * | 9/2005 | Liao | 369/223 |
| 7,055,161 | B2 | * | 5/2006 | Choi | 720/675 |
| 7,352,679 | B2 | * | 4/2008 | Ohno | 369/223 |
| 2001/0017824 | A1 | * | 8/2001 | Okada et al. | 369/32 |
| 2003/0012118 | A1 | * | 1/2003 | Su et al. | 369/223 |

FOREIGN PATENT DOCUMENTS

| JP | 60-147974 A | 8/1985 |
| JP | 61-80549 | 4/1986 |
| JP | 2002-093076 A | 3/2002 |
| JP | 2002-279739 | 9/2002 |

* cited by examiner

*Primary Examiner*—Wayne R Young
*Assistant Examiner*—Thomas D Alunkal
(74) *Attorney, Agent, or Firm*—Birch, Stewart, Kolasch & Birch, LLP

(57) ABSTRACT

A device for traversing optical pickup of a disc drive comprises: an optical pickup unit slidably installed at a guide shaft; a lead screw adjacently and parallel installed to the guide shaft; and a feed guide fixed to the optical pickup unit to be engaged with the lead screw using an elastic force of a plate spring.

14 Claims, 5 Drawing Sheets

DEVICE FOR TRAVERSING OPTICAL PICKUP OF A DISC DRIVE

This non-provisional application claims priority under 35 U.S.C. § 119 (a) on Patent Application No(s). 2003-38426 filed in Korea on Jun. 13, 2003, the entire contents of which are hereby incorporated by reference.

BACKGROUND OF THE INVENTION

1. Field of the Invention

The present invention relates to a device for traversing optical pickup of a disc drive, and more particularly, to a device for traversing optical pickup of a disc drive capable of smoothly transferring an optical pickup unit engaged with a lead screw along a guide shaft.

2. Description of the Conventional Art

Generally, a disc drive is an apparatus for reproducing information recorded in a disc such as a compact disc (CD), a digital versatile disc (DVD), etc. or recording information in a disc. In the disc drive, when a tray where a disc is mounted is loaded into the drive, a drive unit rotates the disc and an optical pickup unit is moved in a radius direction of the disc by an optical pickup transfer device thereby to reproduce/record information stored in the disc.

FIG. 1 is a plane view showing a device for traversing optical pickup of a disc drive in accordance with the conventional art.

As shown, the conventional a device for traversing optical pickup of a disc drive comprises: a first guide shaft 11 formed at one side of an upper surface of a deck 1; and a second guide shaft 12 formed at another side of the upper surface of the deck 1 and parallel to the first guide shaft 11 with a certain distance.

A first guide portion 15 and a second guide portion 16 are respectively formed at one side and another side of the optical pickup unit 13 so as to movably couple the optical pickup unit 13 where an optical pickup 14 is mounted to the first guide shaft 11 and the second guide shaft 12.

An insertion hole 15a for inserting the first guide shaft 11 is formed at the first guide portion 15, and an insertion hole 16a for inserting the second guide shaft 12 is formed at the second guide portion 16.

A lead screw 17 is rotatably installed at the upper surface of the deck 1 to be parallel to the first guide shaft 11.

A feed guide 18 having teeth 18a is fixed to the first guide portion 15 to be elastically coupled to the lead screw 17.

A driven gear 19 is rotatably installed at the end of the lead screw 17.

As shown in FIGS. 2 and 3, the feed guide 18 is provided with a spring 20, and the teeth 18a of the feed guide 18 are elastically coupled to the lead screw 17 by the spring 20.

A connection gear 20 is rotatably installed at the upper surface of the deck 1 to be engaged with the driven gear 19, a driving gear 21 is rotatably installed at the upper surface of the deck 1 to be engaged with the connection gear 20, and a driving motor 22 is connected to the driving gear 21.

In the conventional device for traversing optical pickup of disc drive, when the driving motor 22 rotates the driving gear 21, the driving gear 21 rotates the connection gear 20 again. The connection gear 20 rotates the driven gear 19 thus to rotate the lead screw 17. Herein, since the teeth 18a of the feed guide 18 are engaged with the lead screw 17, the optical pickup unit 13 is moved in a radius direction of the disc. At this time, the optical pickup 14 of the optical pickup unit 13 records a signal on a signal recording surface of the disc or reproduces the recorded signal by reading.

However, in the device for traversing optical pickup of a disc drive, a coupling force between the lead screw 18 and the teeth 18a are determined by an elastic force of the spring 20. According to this, in case that the elastic force of the spring 20 is set to be much less than a reference value, the teeth 18a are loosely engaged with the lead screw 18 or are not engaged thereto thereby not to smoothly transfer the optical pickup unit 13. Also, the teeth 18a of the feed guide 18 may be detached from the lead screw 17 by an external impact generated at the time of falling or carrying a product.

Additionally, in case that the elastic force of the spring 20 is set to be much more than a preset value in order to prevent said problem, the teeth 18a are too adhered to the lead screw 17 thereby not to smoothly transfer the optical pickup unit 13.

SUMMARY OF THE INVENTION

Therefore, an object of the present invention is to provide a device for traversing optical pickup of a disc drive capable of engaging teeth of a feed guide to a lead screw by a proper elastic force and preventing the teeth of the feed guide from being easily detached from the lead screw by an external impact.

To achieve these and other advantages and in accordance with the purpose of the present invention, as embodied and broadly described herein, there is provided a device for traversing optical pickup of disc drive comprising: an optical pickup unit slidably installed at a guide shaft; a lead screw adjacently and parallel installed to the guide shaft; and a feed guide fixed to the optical pickup unit to be engaged with the lead screw using an elastic force of a plate spring.

The feed guide is composed of: a plate spring member having a fixed portion fixed to the optical pickup unit at one side thereof and having an elastic supporting portion at another side thereof; and a first molding member fitted into the elastic supporting portion of the plate spring member and coupled to the lead screw.

A second molding member coupled to the lead screw is further installed at the end of the plate spring member.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
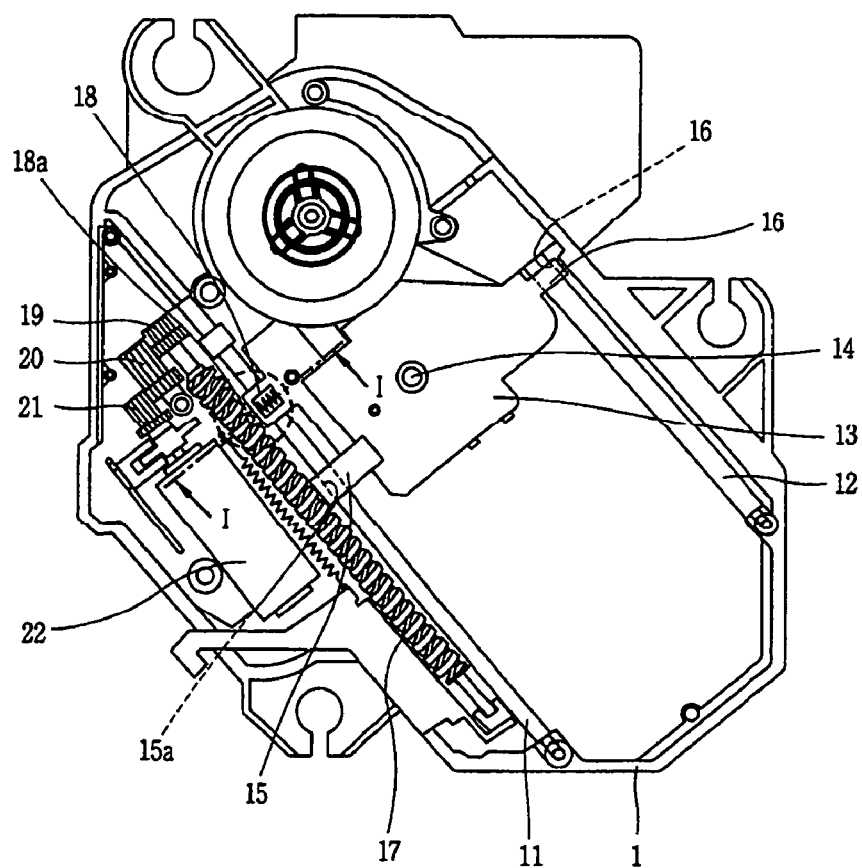
FIG. 1 is a plane view showing a device for traversing optical pickup of disc drive in accordance with the conventional art.
Figure 2:
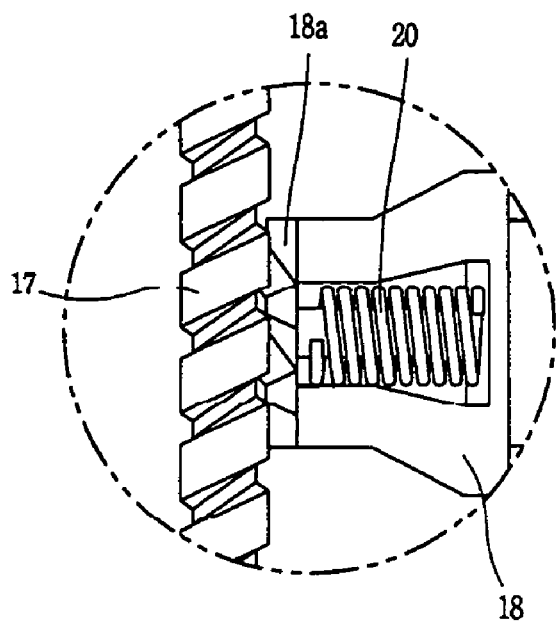
FIG. 2 is an enlargement view of a main part of FIG. 1.
Figure 3:
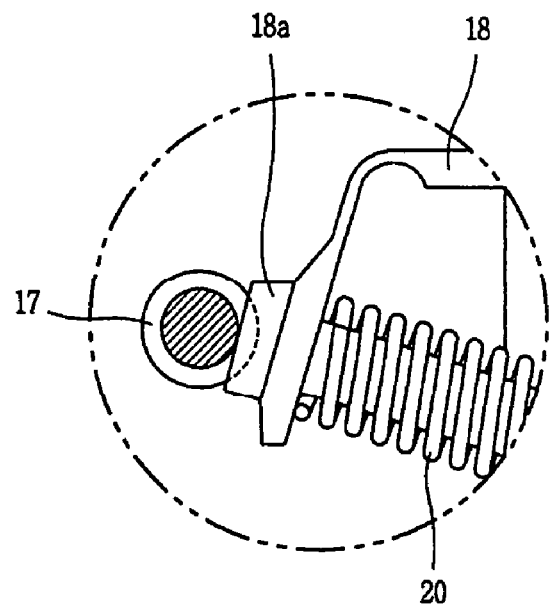
FIG. 3 is a sectional view taken along line I-I of FIG. 1.
Figure 4:
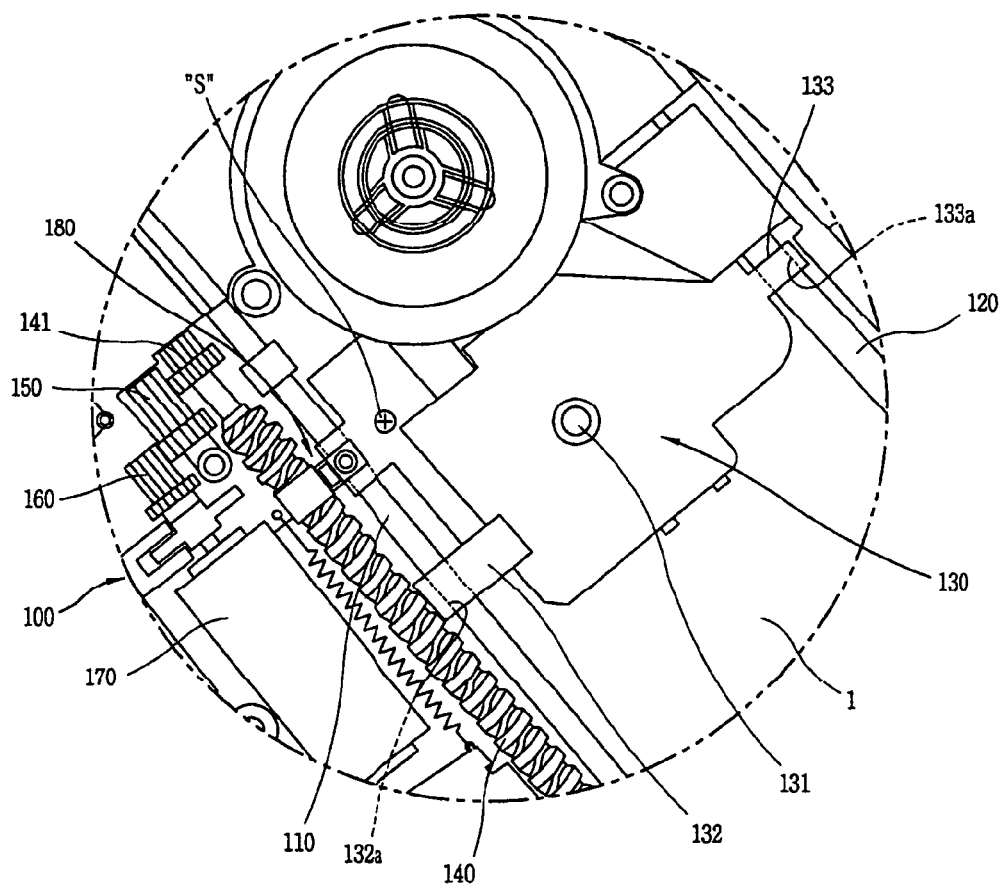
FIG. 4 is a plane view showing device for traversing optical pickup of a disc drive according to the present invention.
Figure 5:
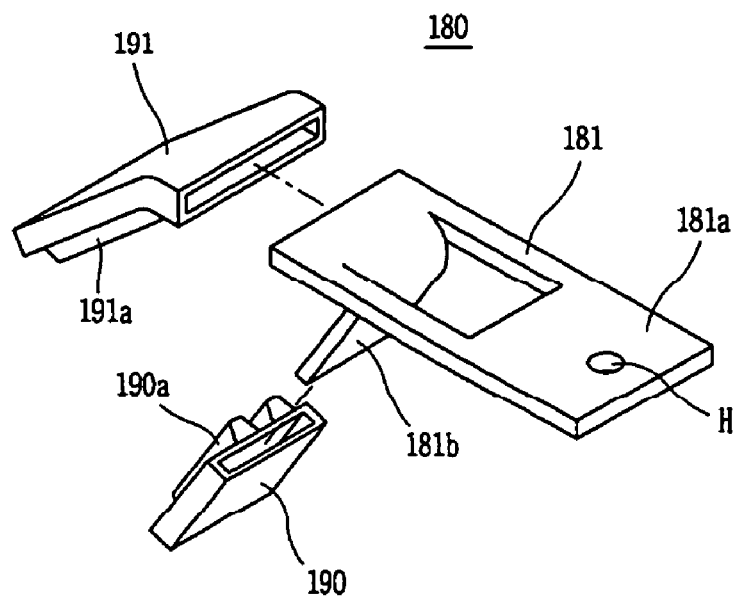
FIG. 5 is a disassembled perspective view showing a feed guide according to the present invention.
Figure 6:
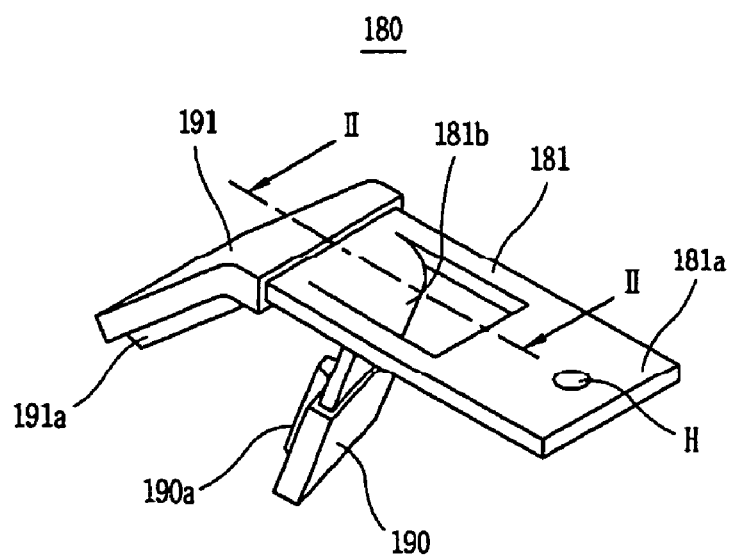
FIG. 6 is an engagement perspective view showing the feed guide according to the present invention.
Figure 7:
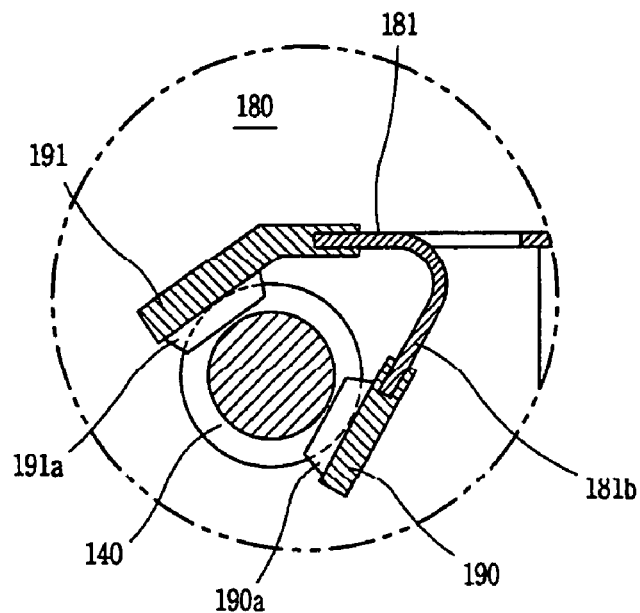
FIG. 7 is a sectional view taken along line II-II of FIG. 6.

FIG. 4 is a plane view showing a device for traversing optical pickup of a disc drive according to the present invention, FIG. 5 is a disassembled perspective view showing a feed guide according to the present invention, FIG. 6 is an engagement perspective view showing the feed guide according to the present invention, and FIG. 7 is a sectional view taken along line II-II of FIG. 6.

As shown in FIG. 4, the device 100 for traversing optical pickup of a disc drive according to the present invention comprises: a first guide shaft 110 formed at one side of an upper surface of a deck 1; and a second guide shaft 120 formed at another side of the upper surface of the deck 1 and parallel to the first guide shaft 110 with a certain distance.

A first guide portion 132 and a second guide portion 133 are respectively formed at one side and another side of an optical pickup unit 130 so as to movably couple the optical pickup unit 130 where an optical pickup 131 is mounted to the first guide shaft 110 and the second guide shaft 120.

An insertion hole 132a for inserting the first guide shaft 110 is formed at the first guide portion 132, and an insertion hole 133a for inserting the second guide shaft 120 is formed at the second guide portion 133.

A lead screw 140 is rotatably installed at the upper surface of the deck 1 to be parallel to the first guide shaft 110.

A driven gear 141 is rotatably installed at the end of the lead screw 140, and a connection gear 150 is rotatably installed at the upper surface of the deck 1 to be engaged with the driven gear 141.

A driving gear 160 is rotatably installed at the upper surface of the deck 1 to be engaged with the connection gear 150, and a driving motor 170 is connected to the driving gear 160.

A feed guide 180 elastically engaged with the lead screw 140 by using an elastic force of a plate spring is fixed to the upper surface of the optical pickup unit 130 by a screw S.

Referring to FIGS. 5 to 7, the construction of the feed guide 180 will be explained. A fixed portion 181a fixed to the optical pickup unit 130 is formed at one side of a plate spring member 181, and an elastic supporting portion 181b is formed at another side thereof.

The fixed portion 181a is provided with a screw hole H for screw-engaging with the optical pickup unit 130 shown in FIG. 4.

A first molding member 190 is fitted into the elastic supporting portion 181b, and teeth 190a engaged with the lead screw 140 are formed at one side surface of the first molding member 190.

A second molding member 191 is fitted into the end of the plate spring member 181, and teeth 191a engaged with the lead screw 140 are formed at one side surface of the second molding member 191.

A generally well-known insert injection method is applied to fit the first molding member 190 into the elastic supporting portion 181b or to fit the second molding member 191 into the end of the plate spring member 181.

The elastic supporting portion 181b is formed by cutting three surfaces of the middle portion of the plate spring member 181 and by downwardly bending one surface that is not cut.

By bending the elastic supporting portion 181b, the teeth 190a of the first molding member 190 can be elastically engaged with the lead screw 140 without using a spring.

Figure 8:
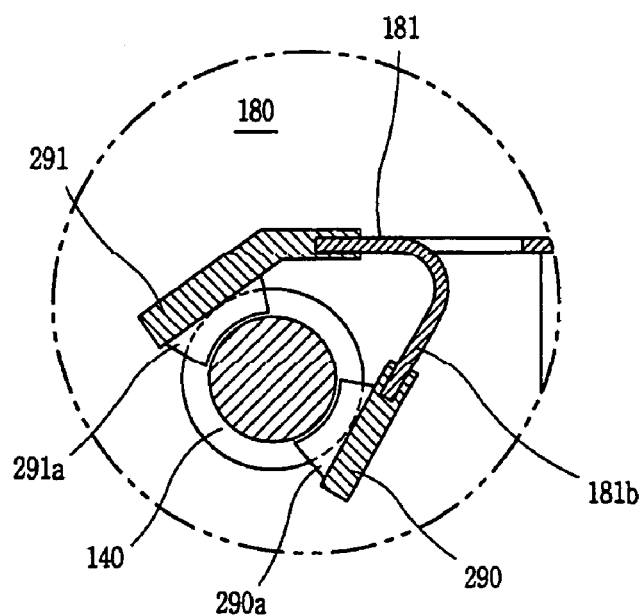
FIG. 8 is a sectional view showing a modification example of teeth of a first molding member and a second molding member.

FIG. 8 is a sectional view showing a modification example of teeth of a first molding member and a second molding member.

As shown, teeth 290a formed at an inner surface of a first molding member 290 and teeth 291a formed at an inner surface of a second molding member 291 are formed as a circular arc shape that winds a lead screw 240.

By forming the teeth 290a and 291a as a circular arc shape that winds the lead screw 240, the teeth 290a and 291a are precisely engaged with the lead screw 240 thereby to more smoothly transfer the optical pickup unit 130.

Hereinafter, operation of the device for traversing optical pickup of a disc drive according to the present invention will be explained.

As shown in FIG. 4, when the driving motor 170 rotates the driving gear 160, the driving gear 160 rotates the connection gear 150 again. Then, the connection gear 150 rotates the driven gear 141 thereby to rotate the lead screw 140. Herein, the teeth 190a of the feed guide 180 are engaged with the lead screw 140.

Also, the elastic supporting portion 181b elastically supports the first molding member 190 towards the lead screw 140 so that the teeth 190a of the first molding member 190 can be properly adhered to the lead screw 140.

At the same time, the teeth 191a of the second molding member 191 are engaged with the lead screw 140 at the upper side of the lead screw 140 in drawing, so that the teeth 190a of the first molding member 190 are not easily detached from the lead screw 140 by an external impact.

As aforementioned, accordingly as a driving force of the driving motor 170 is transmitted to the optical pickup unit 130, the optical pickup unit 130 is moved along the first guide shaft 110 and the second guide shaft 120. At this time, the optical pickup 131 records a signal on a signal recording surface of a disc or reproduces the recorded signal by reading.

According to the present invention, the teeth of the feed guide are engaged with the lead screw by a proper elastic force, and the teeth of the feed guide are not easily detached from the lead screw by an external impact thereby to enhance the reliability of the product.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A device for traversing an optical pickup of a disc drive, the device comprising:
   an optical pickup unit slidably installed at a guide shaft;
   a lead screw adjacently and parallely installed to the guide shaft; and
   a feed guide fixed to the optical pickup unit to be engaged with the lead screw using an elastic force, wherein the feed guide includes:
a first molding member elastically engaged with the lead screw,
a second molding member elastically engaged with the lead screw, and
an elastic member having elasticity,
wherein the first molding member and the second molding member are elastically connected to each other through the elastic member, and
wherein the elastic member is a plate spring member, the plate spring member including:
a flat portion fixed to the optical pickup unit at one end thereof, and fixed to the second molding member at the other end thereof; and
an elastic supporting portion extending from a surface of the flat portion, and fixed to the first molding member.

2. The device of claim 1, wherein the elastic supporting portion is formed by cutting a middle portion of the flat portion and then bending the middle portion.

3. The device of claim 1, wherein an inner surface of the first molding member is formed as a circular arc shape.

4. The device of claim 1, wherein the plate spring member is fixed to the optical pickup unit by a screw.

5. The device of claim 1, wherein an inner surface of the second molding member is formed as a circular arc shape.

6. An optical pickup transfer device comprising:
a guide shaft installed at an upper surface of a deck;
a lead screw adjacently and parallely installed to the guide shaft; and
a feed guide fixed to the optical pickup unit to be engaged with the lead screw at two positions using an elastic force,
wherein the feed guide includes:
a first molding member elastically engaged with the lead screw, and
a second molding member elastically engaged with the lead screw,
an elastic member having elasticity,
wherein the first molding member and the second molding member are elastically connected to each other through the elastic member, and
wherein the elastic member is a plate spring member, the plate spring member including:
a flat portion fixed to the optical pickup unit at one end thereof, and fixed to the second molding member at the other end thereof; and
an elastic supporting portion extending from a surface of the flat portion, and fixed to the first molding member.

7. The device of claim 6, wherein an inner surface of the first molding member is formed as a circular arc shape so as to be adhered to the lead screw.

8. The device of claim 6, wherein the plate spring member is fixed to the optical pickup unit by a screw.

9. The device of claim 6, wherein the main elastic supporting portion is formed by cutting a middle portion of the flat portion and then bending the middle portion.

10. The device of claim 6, wherein an inner surface of the second molding member is formed as a circular arc shape so as to be adhered to the lead screw.

11. The device of claim 1, wherein the first molding member and the second molding member are connected to each other only through the elastic member.

12. The device of claim 6, wherein the first molding member and the second molding member are connected to each other only through the elastic member.

13. The device of claim 1, wherein the feed guide has an opening between the first molding member and the second molding member such that the lead screw slides into the opening to engage the feed guide.

14. The device of claim 6, wherein the feed guide has an opening between the first molding member and the second molding member such that the lead screw slides into the opening to engage the feed guide.

* * * * *